United States Patent
Fredriksson et al.

(10) Patent No.: US 7,882,275 B2
(45) Date of Patent: Feb. 1, 2011

(54) ARRANGEMENT AND METHOD FOR SYSTEM OF LOCALLY DEPLOYED MODULE UNITS, AND CONTACT UNIT FOR CONNECTION OF SUCH A MODULE UNIT

(75) Inventors: Lars-Berno Fredriksson, Kinna (SE); Kent Lennartsson, Fotskäl (SE); Joachim Fritzon, Göteborg (SE)

(73) Assignee: Xinshu Management, L.L.C., Dover, DE (US)

( * ) Notice: Subject to any disclaimer, the term of this patent is extended or adjusted under 35 U.S.C. 154(b) by 767 days.

(21) Appl. No.: 10/479,841

(22) PCT Filed: May 24, 2002

(86) PCT No.: PCT/SE02/00996

§ 371 (c)(1),
(2), (4) Date: Dec. 8, 2003

(87) PCT Pub. No.: WO02/100041

PCT Pub. Date: Dec. 12, 2002

(65) Prior Publication Data

US 2004/0236885 A1    Nov. 25, 2004

(30) Foreign Application Priority Data

Jun. 6, 2001    (SE)    .................................... 0101987

(51) Int. Cl.
  *G05B 15/02*    (2006.01)
  *G06F 19/00*    (2006.01)
  *G06F 3/00*    (2006.01)
(52) U.S. Cl. .............................. 710/19; 700/9; 700/95; 710/15
(58) Field of Classification Search ........... 340/3.1–3.9, 340/825; 700/1, 2, 7, 9, 10, 19, 90, 95, 117, 700/159, 169; 710/1, 15–19; 713/300
See application file for complete search history.

(56) References Cited

U.S. PATENT DOCUMENTS 4,935,863 A * 6/1990 Calvas et al. .................... 700/9

(Continued)

FOREIGN PATENT DOCUMENTS

| DE | 43 00 661 A1 | 7/1994 |
| DE | 196 24 929 A1 | 1/1998 |

(Continued)

OTHER PUBLICATIONS

Lars-Berno Fredriksson; Bluetooth in Automotive Applications; Jun. 9, 1999; Kvaser AB; pp. 1-6.*
International Search Report, Int. Appl. No. PCT/SE02/00996, dated Oct. 8, 2002.

*Primary Examiner*—Alford W Kindred
*Assistant Examiner*—Richard Franklin
(74) *Attorney, Agent, or Firm*—Fitch, Even, Tabin & Flannery

(57) ABSTRACT

An arrangement for a system for controlling, monitoring, communication etc. comprises locally deployed module units which each perform one or more local function(s). The system also comprises one or more system-functioning-determining unit(s) at a higher level than said module units. Also included are one or more connection(s) connecting said units. Each module unit is connected to the connection concerned via a connection facility or connection point. The facility or point comprises one or more microprocessor(s) (microprocessor setup(s)) arranged with compatibility with signalling appearing on the connection according to the rules of systems engineering which apply, and with a higher-level function in relation to the module unit. The invention also relates to a method for said system and a contact arrangement for connection of a module unit to the connection. The invention makes possible outstanding separation of system functions and module unit functions, the result of which is that the various part functions can be produced individually with hardware and used by the system/module unit constructor.

23 Claims, 5 Drawing Sheets

U.S. PATENT DOCUMENTS

| | | | |
|---|---|---|---|
| 5,446,846 A * | 8/1995 | Lennartsson | 710/100 |
| 5,548,743 A * | 8/1996 | Sugiyama et al. | 711/152 |
| 6,000,825 A | 12/1999 | Fredriksson | |
| 6,467,039 B1 * | 10/2002 | Fredriksson | 713/151 |
| 6,473,656 B1 * | 10/2002 | Langels et al. | 700/17 |
| 6,629,247 B1 * | 9/2003 | Hall et al. | 713/300 |
| 6,665,601 B1 * | 12/2003 | Nielsen | 701/50 |
| 6,795,941 B2 * | 9/2004 | Nickels | 714/706 |
| 2002/0161488 A1 * | 10/2002 | Guillemin et al. | 701/3 |

FOREIGN PATENT DOCUMENTS

| | | |
|---|---|---|
| DE | 196 32 993 A1 | 2/1998 |
| DE | 197 40 550 A1 | 4/1998 |
| DE | 197 48 536 A1 | 5/1999 |
| EP | 0 155 213 A1 | 9/1985 |
| EP | 0 703 181 A2 | 3/1996 |
| FR | 2 812 437 A1 | 2/2002 |
| WO | 91/14324 A1 | 9/1991 |
| WO | 97/40429 A1 | 10/1997 |

* cited by examiner

ARRANGEMENT AND METHOD FOR SYSTEM OF LOCALLY DEPLOYED MODULE UNITS, AND CONTACT UNIT FOR CONNECTION OF SUCH A MODULE UNIT

CROSS-REFERENCE TO RELATED APPLICATIONS

This application is a U.S. national phase application filed under 35 U.S.C. §371 of International Application PCT/SE2002/00996, filed May 24, 2002, designating the United States, which claims priority from Sweden Application 0101987-6, filed Jun. 6, 2001.

BACKGROUND

The present invention relates to an arrangement in a distributed system, for example a control, monitoring and/or communication system, which comprises module units, what are known as nodes, which are locally arranged or spread out and perform one or more function(s). The system comprises one or more unit(s) at a higher level than the module units and determining system functioning, and one or more connection(s) connecting said units. The higher-level units determining system functioning can be connected or connectable continuously or on different occasions and also on the same or different occasions with regard to the module unit(s). Each module unit can be connected to the connection concerned via a connection facility, more popularly known as a connection point or connection points. In this context, the units are arranged so as to work according to fixed rules or a fixed rule system. One or more connection(s) can then be used and consist of a multi-wire connection, for example a two-wire connection. The connection can consist entirely or partly of a wire connection, a wireless connection or an optical connection. A connection of the IR type (infrared connection) is also possible. Each wireless connection can be or comprise capacitive/inductive coupling at relatively short distances as well as electromagnetic fields (radio signals) which are transmitted at short or long distances.

The transmissions described above can themselves be regarded as electromagnetic fields, and radio technology can be regarded as technically separate from transformers and near-field transmissions. Light too can be described as an electromagnetic field.

In this context, each module unit can be of the kind which is connected to the bus connection concerned via an establishment of contact, which comprises on the one hand a first contact unit with a first set of contact means which are connected or connectable to the module unit in question and second and third contact means which are connected or connectable to said bus connection. The establishment of contact can moreover comprise a second contact unit which can interact with the first contact unit and has fourth contact means which can interact with the first, second and third contact means in order to make it possible to connect the module unit to the bus connection. The invention also relates to a contact unit of said kind. The invention also relates to a method of producing the system in question for control, monitoring and/or communication.

This kind of system, what are known as distributed systems, can consist of, for example, CAN (Controller Area Network) systems of kinds known per se, which can be of standardized type (ISO). In this respect, mention may be made of field bus systems of the Profibus, Fieldbus Foundation, Control Net, Device Net, CAN-KINGDOM, RedCAN, Ethernet types etc. Reference can therefore be made to different protocol types of said kind with different bit speeds and, in this context, bit speeds in the order of 0.01-500 Mbit/s may be mentioned. Reference can also be made to more striking speed protocols which work in, for example, the 2.45 GHz band (Blue-Tooth). Reference is also made to CAN and USB/IEEE 1394. With regard to construction, functions etc., reference is made to inter alia patents obtained by the same applicant as is making this patent application: U.S. Pat. Nos. 5,371,859, 5,383,116, 5,446,846 and 5,696,911; WO 97/31454, WO 97/40429; and patent applications U.S. Ser. No. 08/954,560 (SE 9402683-3), U.S. Ser. No. 09/101 748 (SE 9600652-3), and the novelty references indicated in these patents and patent applications.

In the production of distributed systems of said kind, there is a need for it to be possible to individually adapt or customize the system to requirements. Today, the market is characterized by a large number of different systems which each meet the various requirements concerned, but where the components and parts of a system cannot be used in other systems or where problems arise when certain components or parts are replaced with components which function differently or are more modern and effective unless a large number of other components are replaced or the overall performance and capacity of the system are restricted. There is therefore a need for it to be possible to propose systems which, in the manufactured state, can be subjected to modifications without major rebuilding and reconstruction being necessary and without the specifications of requirements having to be changed for the system as such. It is also important for it to be possible to break the system construction down into the system functions of which the system is composed and which are themselves very distinct. For example, it is important for it to be possible for the design in terms of systems engineering to be carried out essentially independently of the module unit application and for the system construction to be organized primarily by the system experts without them having to go into the construction and functions of the module unit and make special demands of these on account of system construction and system functioning. Conversely, it is likewise important for it to be possible for the local functions which the module units are to be capable of performing to be carried out and subjected to requirements without this involving demands having to be made for system functioning to be changed on account of modified requirements or specific peculiarities of module functioning, or system functioning and module unit functioning having to be limited or effected in a special way in relation to applicable (for example standardized) basic functions and basic requirements/rule systems. The present invention aims to solve all or some of these problems by making possible construction of the system and the module units which is in principle modular and where it is not necessary to begin construction by starting out from the functions of the module units and then adapting the rest of the system structure to these. Instead, it is to be possible from the outset to establish the system type which is considered suitable, after which the construction and connections of the module units are arranged so that they will be capable of working with the system thus selected. The object of the invention is to solve this problem also.

A desire therefore exists for it to be possible to structure and simplify the construction and to bring down costs in comparison with conventional arrangements and methods. The function module itself does not have to be designed for a specific system, and vice versa. The module unit is to be capable of being designed with its local task(s) and is also to be compatible in relation to the requirements of systems engineering. The invention solves this problem as well.

In using existing systems in order to solve certain problems which arise, it has been found that finding a solution to the problem has been relatively complicated in practice and that a need exists for simplification in this respect. The present invention solves this problem by proposing adaptivity to other system(s) with a better capacity to solve the problem in question without it being necessary to this end to deviate from the basic system or the system type as such. A need may also arise for it to be possible to double-utilize the connection system so that, for example, it can perform a basic function at the same time as it is possible, in a time-slot arrangement or via a filter arrangement, to transmit protocol functions which work at a different bit speed, for example a considerably higher bit speed.

There may consequently be a need for it to be possible to transmit software or other downloadable functions to the module unit(s) simultaneously with or alternatively to basic functions performed with the downloading or transmission in question. The invention solves this problem as well.

A need also exists for a simple and reliable possibility for performing test and simulation functions during system construction and/or in system functioning. There is also a desire for it to be possible to increase the supply of module units which can be sold separately on the market in relation to the rest of the system, and for the system to be capable of using a significant number of systems and selected protocol types. As far as the module unit is concerned, the use of what is known as a gateway or individual control and monitoring of the module unit on the part of the system are to be possible. The connection and/or the point-point connection should also be capable of working by wire, wirelessly, by optical means, by IR or a combination or combinations thereof (see also the concepts referred to above). In the case of connection of systems with high bit speeds, it is to be possible for transmission with a great bandwidth to be effected. The module units are to be capable of belonging to, for example, CAN and USB, the module units being connected to the system setup concerned, for example of the CAN type. The USB module is then made with adaptations to the CAN system while the CAN module can work without said adaptation to the CAN system etc. The invention also solves all or some of this problem.

SUMMARY

An arrangement according to the invention can be considered to be characterized mainly in that each connection facility or connection point referred to in the introduction comprises one or more microprocessor(s) arranged on the one hand with compatibility with signalling (protocol) appearing on the connection(s) according to the rules of systems engineering which apply for the system, and on the other hand with a higher-level function in relation to the module unit. Each connection facility or connection point can be considered to comprise one or more microprocessor(s) arranged so as to work with passively higher-level functioning, which in this context means, for example, functioning for monitoring, protection, simulation etc. in relation to the module unit concerned. The latter is then arranged with its own microprocessor(s) which, essentially separately from the microprocessors of the connection facility or connection point, handle(s) the locally performed function(s) of the module unit. As an addition or alternative to said feature, the microprocessor(s) of the connection facility or connection point can be arranged so as to work actively with protocol or signal conversion functions, that is to say to work as a gateway essentially separately from said locally performed function(s) in the module unit.

In this context, microprocessor(s) means a completely functioning unit with inter alia a CPU and associated memory means. The term "microprocessor" can also be considered to include the surrounding electronics necessary for the microprocessor to be capable of functioning from the point of view of power supply, the point of view of reception, the point of view of control etc. By way of examples of microprocessor, reference is made to the microprocessors sold on the general market. Examples of processors may therefore be ARM, 8051, x86, PIC etc., which can work with 4, 8, 16, 32 and/or 64 bits in width. In this context, the memories can be those which retain information even in the absence of voltage, for example Flash, EPROM, EEPROM or magnetic media. The memory or memories can also be of a temporary nature, where the contents disappear if there is no battery or the like providing voltage. In order for such a combination to function, there must also be a voltage supply, an oscillator and interface circuits suitable for the function or task concerned. The interface circuits can be divided into two levels, one of which adapts the signal levels, for example RS-232, ISO 11898, voltage, current and RF signals, to a signal level more suitable for the logic, and the other of which adapts these signals to signal kinds which can be processed in a known manner by the logic functions of the processor, that is to say to a data word which can be addressed and read by the processor.

According to the present application text, the term processor includes not only standard microprocessors on the market with different word width. Processor includes all types of state machines or states which by means of software, permanent or downloadable, can process information in such a manner that the problem in question can be solved. Such a processor does not have to use a standard word width 8, 16 etc., but can have a word width suitable for the problem. Such a processor can be completely reprogrammable by being located in an FPGA or be more or less permanently constructed or designed in a gate array or ASIC.

It is characteristic of an arrangement for control, monitoring and/or communication etc. of the kind referred to in the introduction that, inter alia, the contact unit mentioned in the introduction comprises or is connected to one or more microprocessor(s), with which the second contact unit is arranged so as, depending on system information via the bus connection and/or information assigned individually to it, to cooperate in or determine the connection and disconnection of the module unit to and from the bus connection. Additionally or alternatively, the arrangement can be considered to be characterized by, depending on said system information via the bus connection and/or the information assigned individually to it, establishing internal or direct cooperation with the module unit, for example for configuration, diagnosis, simulation etc. thereof. Additionally or alternatively, the arrangement is also characterized by being capable of sensing the signal status (protocol) of the bus connection and passability on the bus connection, all as seen from the module unit.

The method referred to in the introduction can be considered to be characterized mainly in that a basic system concept is brought about by means of a suitable computer tool, which in this context can consist of Kingdom Founder or a similar kind (type), which basic concept comprises indicating the messages which the module unit concerned is to send and receive, the bit speed which is to be used in the system, how the protocol in the system is to be designed, the scheduling of the messages, the cable lengths which are to be used, and indicating error detection and error handling mechanisms which are to be present in the module unit concerned. The method is also characterized in that the basic concept information produced is used in order to determine the construction of a connection facility which is to be present in each module unit, which connection facility is arranged so as in a first stage to serve as a module simulator by sending correct messages according to the scheduling in order to verify this and by sending incorrect messages or violating protocol and/or scheduling in order to check that the system behaves in the expected manner in the event of error. Alternatively or additionally, the method is characterized in that a test program can be created in order for it to be possible to monitor the behaviour of the module unit.

Embodiments of the arrangement, the contact unit and the method according to the above emerge from the discussion below. The invention is especially advantageous for use in conjunction with said CAN systems according to existing ISO standards or corresponding systems which work as distributed systems for control of and in vehicles/cars, machine systems, process systems etc. In such systems, there may be a need for it to be possible to retain and work with the rule system of the CAN system at the same time as generalizations can be made in the control processes and different peculiarities or exceptions which arise on a functional level in practice can be accommodated. The control and monitoring processes can therefore be made uniform and more effective, and special exceptions attaching to a system with regard to functioning can be eliminated temporarily or permanently so that unambiguous interpretation situations on the part of, for example, the module units arise. Great effectiveness can be built into the systems, and these can be arranged with double functions, for example with basic functions and temporary downloading functions with the multi-wire or multi-channel connection concerned being retained. It is possible, in the case of application in Blue-Tooth with, for example, 2.45 GHz, in combination with the basic function, to obtain a large number of channels in the transmission carried out, for example 79 channels. Impedance adaptations known per se can be carried out in the module unit concerned. In this way, the aim is to obtain reduced losses. A given number of modules, for example one or more, can be provided with the high-speed transmissions in question, which, according to the invention, can be carried out in a point-point connection. By virtue of the invention, it becomes possible to divide software functioning into two independent parts, one software function handling the system and the other software function handling local functioning in the module unit concerned. By virtue of the invention, the hardware for the software functions is also divided into two parts, one or more first microprocessor(s) and any peripheral equipment for these handling local functioning and one or more second microprocessor(s) handling system functioning.

BRIEF DESCRIPTION OF THE DRAWINGS

A for the present proposed embodiment of an arrangement, a method and a contact unit according to the invention will be described below with simultaneous reference to the accompanying drawings, in which.

DETAILED DESCRIPTION

Figure 1:
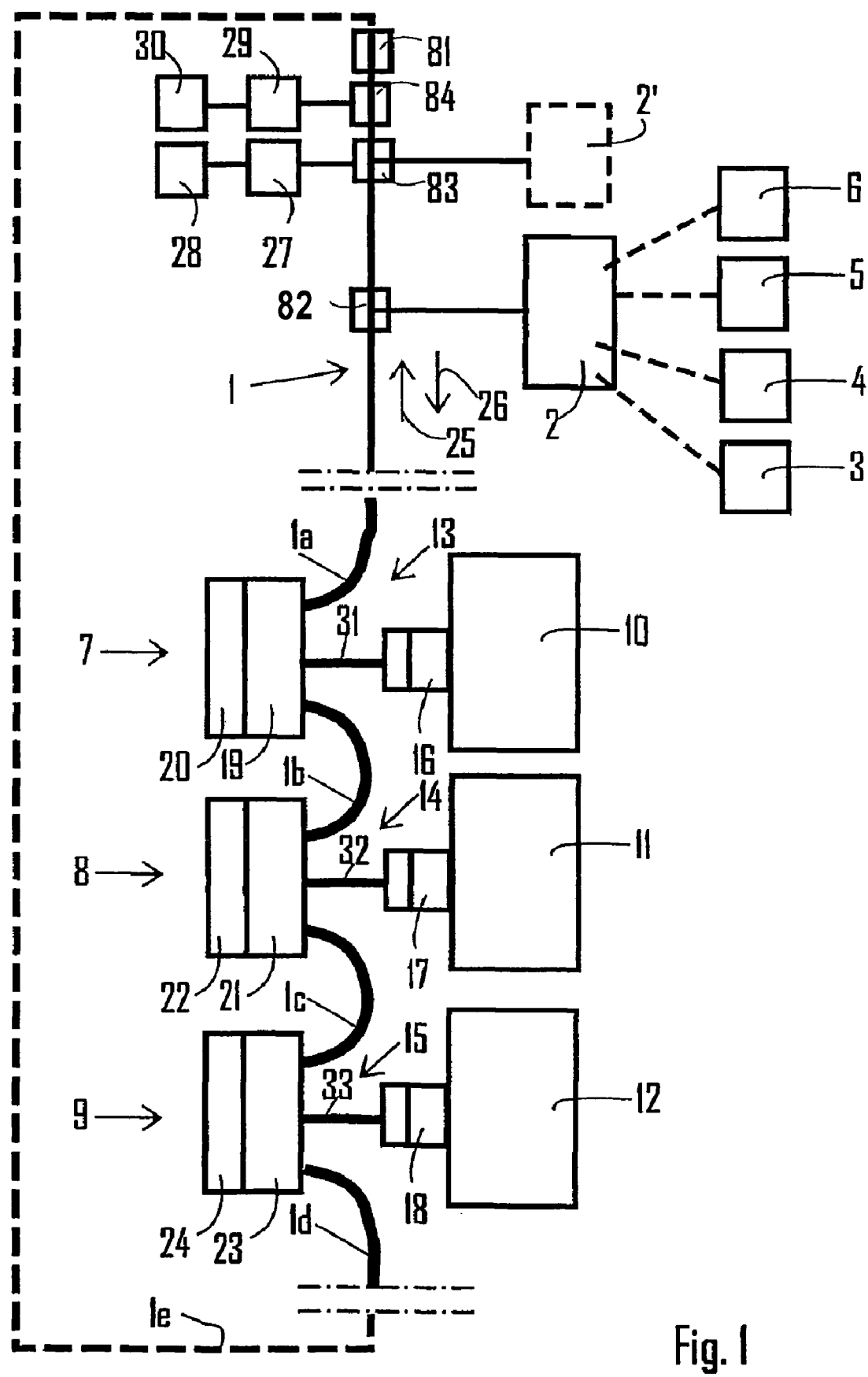
FIG. 1 shows, in the form of a skeleton diagram and in principle and with logic functions and blocks in combination with physical and geometrical blocks, parts of a distributed system with module units and units at a higher level than this system and also connections between the units.

In an illustrative embodiment, use is made of a CAN bus and the number of module units or nodes indicated below which can each have contacts in both directions on the bus. The establishment of contact can comprise what is known as a blind contact function in accordance with the description below. The blind contact can serve as a purely electrical connection and can be designed in a manner known per se. The blind contact or equivalent can be provided with one or more microprocessor(s) and/or one or more memory or memories. When the blind contact is applied, the CAN bus and the voltage supply and also the microprocessor, memory etc. are connected to the module unit or node in question. The functioning of the blind contact is expanded by providing it with one or more processor(s) which, on connection, are linked to the CAN bus. In this way, processor power is obtained in the connection, and basic functions for the bus monitoring can be located here and work entirely independently of the connected module unit. In this context, various types of module unit can be used; for example, a standard node which forms part of or can interact with, for example, the RedCAN system can be used. Information about every module unit or node can be downloaded via the CAN bus before the node is connected. By means of the contact processor, the module unit or node can be disconnected from the CAN bus in the event of problems arising, without this affecting the bus connection itself. With its microprocessors, the contact unit can monitor the communication between the module unit and the CAN system. It can, for example, ensure that the node has contact with the bus only when such contact should exist according to a sending/receiving schedule incorporated into the system. In one embodiment, the contact processor(s) and the module unit in question can share a memory. This memory can form part of the local communication between the contact unit and the module unit. The blind contact can be made with different designs and constructions and also functions so that the connection in question can be made intelligent and with a greater or lesser degree of hardware functionality.

The connection facility or connection point between a module unit in a system and the information channel(s) of the system, that is to say the connections, become intelligent in this way and can form part of the system development. The microprocessor(s) in question can be provided in a manner known per se with the necessary peripheral components and can, during normal operation, be connected to a module unit. The purpose of the connection facility or connection point is inter alia to look after the module unit so that the latter meets essential system requirements. Alternatively or additionally, the connection point can include components which are necessary in order to meet system-related requirements. Examples of such requirements are protection and monitoring requirements, and connection and disconnection requirements with regard to the system information channel(s). The connection facility can communicate with at least one module unit which has system information irrespective of whether or not the module unit is connected. In itself, one and the same connection point can serve two or more module units. The connection facility can be assigned an on the whole passive monitoring role during normal operation or have an active role as, for example, a gateway.

In distributed systems, the module units or nodes basically have double roles. On the one hand, they are to carry out their local task but, on the other hand, they are to meet system-specific requirements. Previously, the boundary between the requirements has been fluid, and there have been two opposite system philosophies. The basis for one system philosophy is that the system functions should as far as possible be distributed to the modules, while the basis of the other is that the system functions should as far as possible be separated from the module units. The invention relates especially to the latter philosophy, and the inventive concept will be regarded as being that every node for the module unit has in principle two module units, one mainly for dealing with system requirements and the other mainly for dealing with the local function concerned. The advantages of this approach can be seen most clearly if the development phases for a system design are studied. The basic system development can therefore be carried out using a suitable computer tool, for example of the Kingdom Founder type from Kvaser, Sweden, as far as CAN systems are concerned. This defines the messages which the module concerned is to send and receive, the bit rate/speed which is to be used, how the protocol is to be designed, the scheduling of the messages, the cable lengths which are to be used etc. The detection and error handling mechanisms which are to be present in the module unit/node concerned are also indicated. The information produced is used in order to design the module unit/node concerned which is to be present. The local system module unit/node can be designed so as in a first stage to serve as a connection simulator by means of sending correct messages according to the scheduling in order to verify this and by sending incorrect messages or violating protocol and scheduling in order to check that the system behaves in the expected manner in the event of error. Furthermore, test programs can be created in order for it to be possible to monitor the behaviour of the local system module unit/node. Every local system module unit/node has a microprocessor pair, and the expert developing a connection point or connection facility can obtain a module unit developed for this from the system designer together with PC software which simulates other pairs of connection points and module units. In this way, the developer of the connection point concerned can carry out advanced tests before the connection point or connection facility is tested in the final system.

By division into said pairing, the development time and the cost can be reduced in comparison with conventional design. The function module itself does not have to be designed for a specific system. If the module unit/node serves as a gateway, the connection between the connection facility and the module unit can in many cases be comparatively simple and inexpensive as the connection involved is a permanently connected-up point-to-point connection. The connection can thus be of, for example, the USB type or an IEEE 1394 (FIREWIRE®) connection, while the system connection can be of the CAN type. Other types of connection are possible, for example optical connections or radio connections, and various types can moreover be used simultaneously; for example, an optical connection can be used between the module unit and the contact facility in a CAN system and vice versa. Although the module unit and the contact facility and also the system communicate by CAN means, the module unit can be made relatively inexpensively using a simple 251 type, while the contact facility provides characteristics which would otherwise have required more advanced circuits, for example 1053/1054 type circuits, and/or RedCAN characteristics. In scheduled systems, the contact facility can be responsible for the time-keeping of the module unit, while the module unit can have a simplified local clock or quite simply receive trigger signals from the contact facility according to a local protocol or direct trigger lines. If the error handling system is of, for example, the RedCAN type, these can be made more effective in relation to the known art by virtue of the contact facility being developed with regard to a specific module unit. At present, according to the known art, the entire module has to be designed with RedCAN characteristics. With the proposed solution, any CAN module can be connected to the contact facility, and the contact facility gives the module unit or node the RedCAN characteristic required at system level. If an error originates from the module unit, the latter can be physically disconnected locally, without switching over having to take place at bus signal level. Even modules of a kind other than CAN modules can be connected by means of suitable construction (design) of the connection unit(s).

In FIG. 1, a connection in a distributed system of the type concerned is indicated in principle by reference number 1. One or more higher-level unit(s) 2, which comprise or are provided with the system-controlling requirements or the rule system represented in principle in FIG. 1 by the devices 3, 4, 5, 6, are connected or connectable to the connection. Basic concept information as referred to above is introduced via these devices. More than one higher-level unit 2 can be present, which has been symbolized by the unit 2'. The system also comprises a number of nodes, symbolized by reference numbers 7, 8, 9. Each node comprises one or more module unit(s) 10, 11 and 12 and also contact facilities or connection points for these. The contact facilities or connection points have been indicated in principle by reference numbers 13, 14 and 15. Each module is provided with a module contact 16, 17 and 18. The contact facility comprises first and second contact units 19, 20 and 21, 22 and 23, 24. The connection of the module units 10, 11 and 12 to the connection 1 is effected by means of connection parts 1a, 1b, 1c and 1d, between the module units shown. In one embodiment, the connection can constitute an annular connection, which is shown by the connection part 1c. The module units can therefore in principle communicate with the higher-level unit(s) or other module units in both directions, which are indicated in FIG. 1 by the arrows 25, 26. The connection can in principle be of any kind or type used in distributed systems for control, monitoring, communication etc. The module units 10, 11, 12 can likewise be of any type included in the various systems which exist in this context. The units 10, 11 and 12 can moreover be of different types, that is to say they can in principle consist of different modules belonging to different system types. The connection can in principle work with a single basic protocol, for example a CAN protocol. Alternatively, the connection 1 can be divided up or split up for different protocol types, in which case there can be a first basic protocol which works at a lower bit speed, for example 1 Mbit/s, and a protocol working at a higher bit speed, for example with bit speeds of 10 or 100 Mbit/s. The two protocols can have access to the connection 1 via a time-slot arrangement which is brought about by a unit 27. In FIG. 1, the protocol-implementing units are symbolized by 28. Information from the units 28 is distributed to the units 20, 22, 24. Alternatively, access to the connection 1 can take place or be available simultaneously, in which case the various protocol signals are separated by a filter arrangement 29. In the figure, the units interacting with the filter arrangement 29 have been indicated by reference number 30. In this respect, it may be mentioned that each connection point is provided with a filter function or filter arrangement. The protocols working at high bit speed can be used in order to transmit to the nodes 7, 8, 9 information differing from the information transmitted by means of the basic system which works at lower speeds. According to the invention, the information obtained on the connection 1 is received in the contact facilities, to be precise in the contact units 19, 20 and 21, 22 and also 23, 24. Said contact facilities are connected to the module unit via connections 31, 32 and 33 respectively, which can consist of a point-to-point connection and be of the wire type, a wireless connection etc. The wireless type can consist of a radio connection, optical connection etc. In the illustrative embodiment, the bus line 1*e* is connected to 1 via a connection unit 81. Depending on the communication possibilities offered on or in the bus connection 1, 81 can constitute, for example, a mechanical connection, a gateway between the parts concerned etc. In a preferred embodiment, the lines are interconnected via passive or active components. As far as passive interconnection is concerned, use can be made of various types of filter and attenuator which are intended to prevent undesirable oscillations and resonances. The unit 81 can, in combination with or without passive components, comprise various types of change-over switch for interconnecting bus conductors with one another or to passive or active components. In this case, active components can be various types of filter and attenuator. The connection points 7, 8 and 9 can also comprise this type or similar functions. Connection points 82, 83 and 84 for the units 2, 27 and 29 could also be made with such functions for through-connecting the bus connection 1. In this case, there is a connection to the bus. How this connection appears depends on the type of bus connection concerned. In the case of CAN and USB, there is usually an interface circuit which converts the signal levels of the bus connection to levels suitable for the internal communication control. In one embodiment, use is made of inductive components such as coils and transformers (cf. Ethernet and ISDN). In the case of high frequencies and pulses, use can be made of capacitors for connection to and from the bus connection. If the transmission on the bus connection takes place by means of electromagnetic fields, the connection can be regarded as an antenna which transmits the signal from the unit out onto the bus medium which in this case is in the form of a waveguide.

In one embodiment, construction is effected with the various units separated. It is possible, however, to use physically attached units, but it is important to separate the task of managing the system, that is to say the communication on the bus connection 1, and the internal tasks of the module concerned. The great advantage of this is that it is possible to make adjustments in system functioning 20 and in the module 10 without these affecting one another directly or it being necessary to make any direct mutual allowance between the system tasks and the internal tasks, provided this does not affect what 20 and 10 exchange via 16. The first advantage obtained in this way is the division of the problem. The module may be produced by, for example, a motor controller which is to control an electric motor at the correct speed and acceleration between different points. These complicated and difficult tasks can be done without the designer having to worry about whether the system communicates using Ethernet, CAN etc. or which interpretation is to be placed upon the data to be transmitted and how often and when in time this exchange is to take place. The only thing the designer has to ensure is that the communication between 16 and 19 takes place according to stipulated conditions. In the simplest case, however, it may be that the module, for example 10, has direct contact, via 31, with the bus 1*a*/1*b*. In this case, the module 10 must comprise all the parts necessary for communicating on the bus connection, that is to say it must know which medium is involved, for example CAN or Profibus etc., and it must also know how the information is to be packaged and when in time it is to be sent to and received from the bus connection. In this case also, the unit 19 and 20 can afford advantages in the system. In this case, the unit can ensure and configure the unit 10 via 31 and ensure that these settings are correct before the unit is connected to the system via the bus connection 1. FIG. 1 shows two different types of connection to the interconnected communication 1, 2, 27 and 29 and also the modules 7, 8 and 9. In the first case, connection takes place directly to the bus connection, which is possible in a case where the connected units have or are arranged with all the parts necessary for the system physically positioned on the unit (see units 2, 27 and 29). There is nothing to prevent these units as well using standardized connections like the units 7, 8 and 9. As far as connection points according to the units 7, 8 and 9 are concerned as well, there can be different geometrical constructions even though basic functioning is the same. If the unit or module 7 is taken as an example, it is possible to see a number of divisions which can all be used in the invention, depending on the characteristics with which the system is to work.

Figure 2:
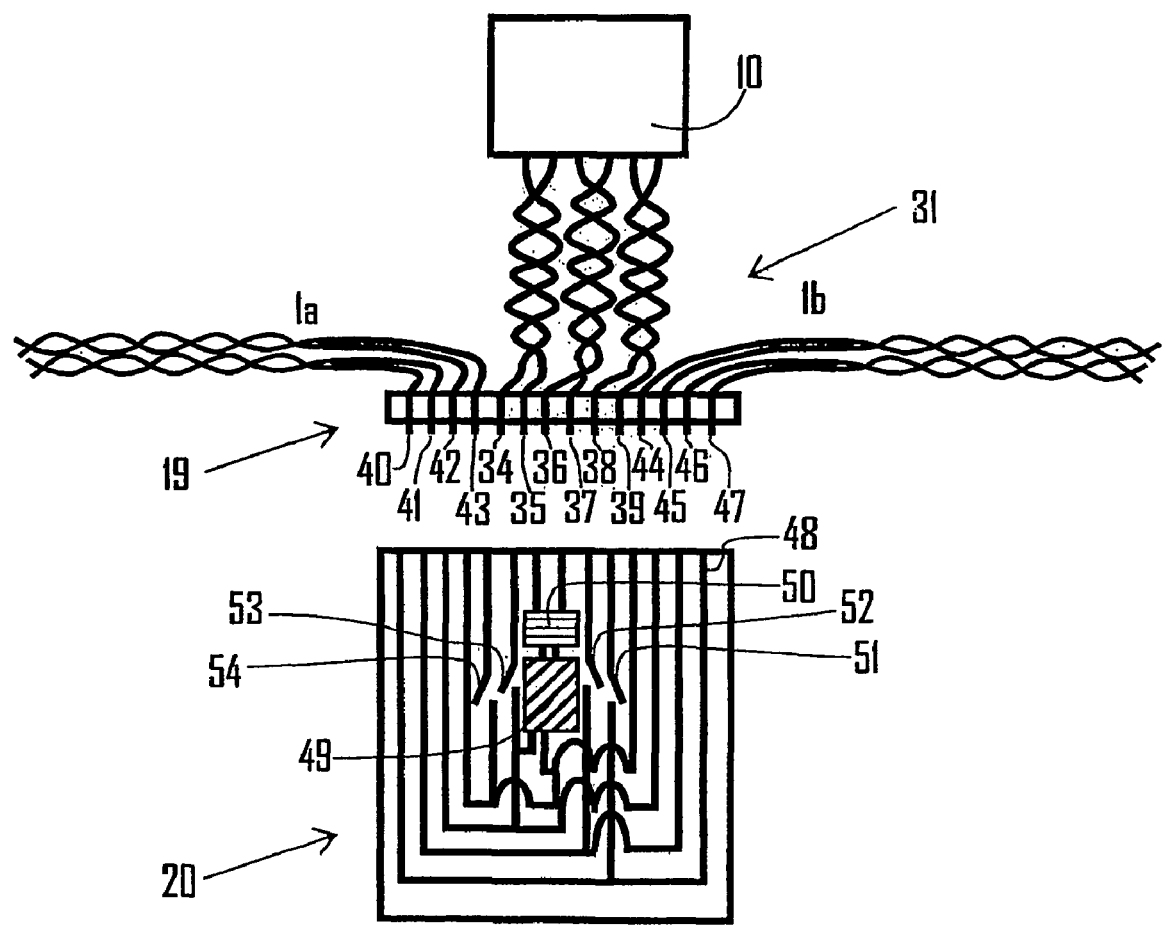
FIG. 2 shows a vertical view of a contact facility at the connection point between the system and a module unit.

FIG. 2 shows a typical example of the construction of the parts 10, 19 and 20 and also the connections 1*a*, 1*b* and 31. The contact unit comprises a connection unit or first contact unit which has a first set of contact means 34, 35, 36, 37, 38 and 39 which are connected or connectable to the module unit and second contact means 40, 41, 42, 43 which are connected to the connection part 1*a* and also, finally, third contact means 44, 45, 46 and 47 which are connected to the connection part 1*b*. The second contact unit is provided with fourth contact means, one of which is indicated by reference number 48. Said fourth contact means can interact with the first, second and third contact means in the unit 19. The contact part or blind contact 20 is provided with a microprocessor 49 and/or memory means 50. The microprocessor comprises or interacts in a manner known per se with peripheral electronics so that contact functions 51, 52, 53 and 54 can be controlled by the microprocessor(s). Said contact functions can consist of a relay function, transistor arrangements which can be cut off, semiconductor arrangements etc. By means of the contact functions, the module unit can be connected in both directions (cf. arrows 25, 26 in FIG. 1), that is to say towards the connection parts 1*a* and 1*b*, or in either direction, that is to say towards either 1*a* or 1*b*. The microprocessor(s) 49 can receive information from the connection 1*a* and/or 1*b* and also deliver information to the connection parts 1*a* and/or 1*b*. By means of the memory or memories 50, information can be stored in the contact unit 20. The microprocessor(s) and/or the memory 50 can also receive and deliver information to the module unit 10. In accordance with the above, the microprocessor 49 handles the system functions and, by means of these, translates or controls the information for the module unit 10. In accordance with the description below, the module unit 10 is, in a manner known per se, provided with its own microprocessor(s) and/or memory capacity. The microprocessor(s) of the module unit work(s) with reduced functioning in relation to previously because it (they) control(s) only the local functions in the module unit 10.

FIG. 2 has been shown in simplified form for the sake of clarity. Therefore, only connection of the microprocessor 49 to the bus connection 42, 43 is shown. It is possible to imagine the microprocessor 49 also comprising double functions so that it can be connected to both the contact means 42 and 43 and also 40 and 41. This then requires the microprocessor 49 to have double communication units in the event that it needs to communicate independently and simultaneously with the contact means 42/43 and 40/41. It is also possible to imagine that in a case in which the same type of communication is used on the contact means 40/41 and 42/43, the microprocessor 49 can, with a multiplexer, connect its communication controls alternately to one or the other. It may also occur that the microprocessor 49 is, in a similar way, connected both to the contact means 42/43 and to the module 10 via the contact means 34/35. In a case where the microprocessor 49 comprises two communication units and the contact functions 53 and 54 are open, it can communicate simultaneously with the unit 10 via the contact means 34/35 and the system via the contact means 42/43. In the case of such connecting-up, 49 can serve as a bridge between the module 10 and the system. One reason for such connecting-up may be that the unit 10 does not communicate in a manner suitable for the system. The unit will then function as a translation between the unit 10 and the system. This conversion can be both electrical and data logical, that is to say use is made of the same communication but the packaging of data in the transmission is not consistent with what is valid in the system. An example of the former is if the unit 10 is a module with Profibus and the system uses CAN. An example of the latter is if 10 uses the CAN bus connection according to DeviceNet while the system uses CANopen. What was described for the system bus connection on connection to the microprocessor 49 also applies on connection of the microprocessor 49 to the bus connection and the module 10 via the contact means 38/39. In this example, there are two system bus connections connected to the contact means 40/41 and, respectively, the contact means 42/43 and also three connections to the module unit 10. In the simplest case, there may be only one system connection and, in that case, the contact means 40, 41, 36, 37, 38, 39, 46 and 47 disappear. By making it possible for the microprocessor 49 to connect to both the contact means 40/41 and 34/35, it can communicate with the system and the module with the change-over switches 53 and 54 open. With this connecting-up, the microprocessor 49 can on the one hand obtain knowledge and information about the system via the contact means 42/43 and on the other hand obtain information about the module via the contact means 34/35. By means of this information exchange, it is possible for the microprocessor 49 or the microprocessor 49 together with a system-coordinating unit 2 to configure the unit 10 so that it fits the system. If the protocol of the contact means 34/35 coincides with the contact means 42/43, the change-over switches 53 and 54 can subsequently be closed, and the unit can communicate directly with the system. If the protocol does not coincide, the microprocessor 49 can remain active and function as a translation bridge between the unit 10 on the bus connection at 34/35 and the system via the contact means 42/43.

Figure 3:
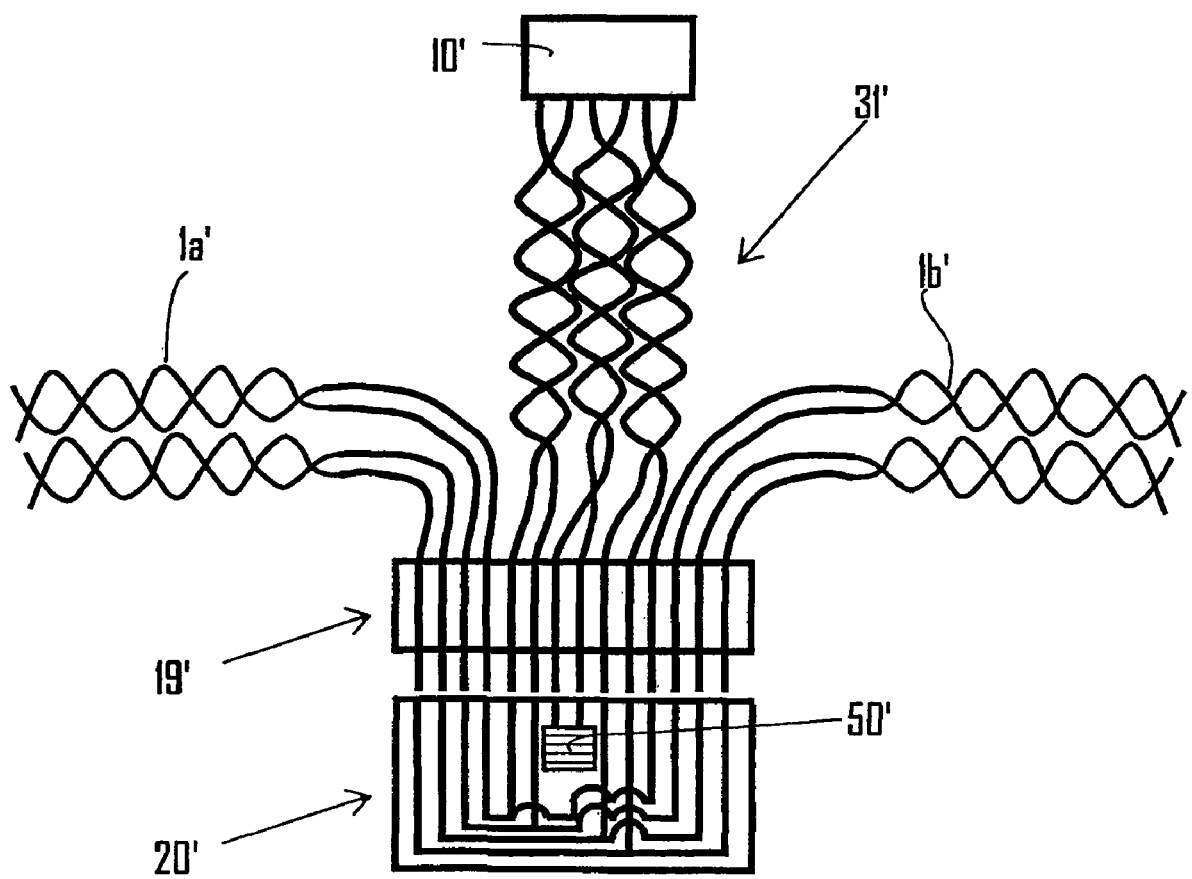
FIG. 3 shows a vertical view of a contact facility which is slightly modified in relation to the contact facility according to FIG. 2.

FIG. 3 shows a further embodiment of the construction of the contact facility, which contact facility, in a manner corresponding to that in the embodiment according to FIG. 2, has the contact unit 19' and 20', and where the contact unit 19' is connected to the connection parts 1a' and 1b' as well as 31'. In this case, the module unit is indicated by reference number 10'. The blind contact is in this case provided with a memory 50'. Said memory is assigned or connectable to the module unit 10' via the first and fourth contact means (cf. above). This constitutes an alternative to the facility according to FIG. 2 where the memory 50 or the memory capacity is in principle used jointly by the module unit and the microprocessor 49 in the blind contact.

Figure 4:
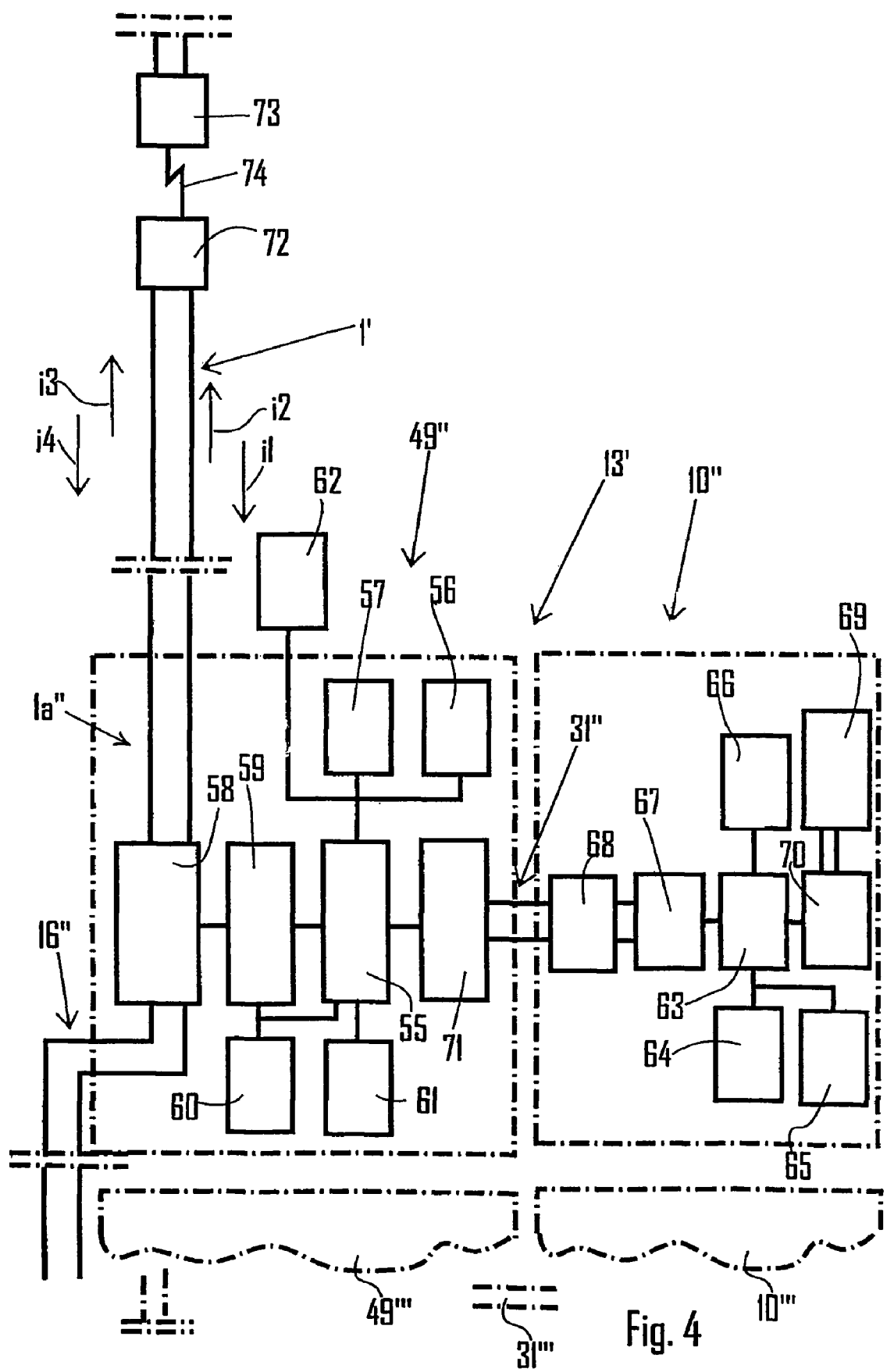
FIG. 4 shows in the form of a block diagram and in principle a more detailed construction relating to a contact facility or connection point for a module unit and the connection in question.

In accordance with the above, it can be seen that the software of the contact facility 13' concerned has, in relation to previously, been divided into two parts where one part is arranged in the microprocessor unit 49" and the other part is arranged in the microprocessor unit 10" of the module. The purpose of FIG. 4 is to illustrate that a division in terms of hardware has also taken place so that the contact facility has its own microprocessor setup with one or more microprocessor(s) 49", 49''' etc. In a corresponding manner, the module unit comprises its own microprocessor setup with one or more microprocessor(s) 10", 10''' etc. In this case, the connection or the establishment of contact is between the module unit indicated by 31" and the connection parts as above indicated by 1a" and 1b". The setup 49" comprises a CPU 55 connected to logic circuits 56 and RAMs 57. Also included in or forming a part of the unit is an adaptation unit 58 which consists of an impedance adaptation unit which keeps energy losses low on connection to the connection parts 1a" and 1b". The impedance adaptation takes place in both directions in accordance with the above. Said impedance adaptation unit also effects the connection in both said directions or in either direction. The setup according to 49" also has a CAN module. Also included are timing circuits 60 and memory circuits 61. The setup 49" can also be connected or connectable to external memories 62 which are in turn connected to the connection 1'. This connection as well can be effected via an impedance adaptation unit (not specially shown). The setup 10" comprises a CPU 63 with logic circuits 64 and RAMs 65. Also included are timing circuits or timing receiving circuits 66 and a unit 67 related to CAN or another type of module. There is also a circuit 68 for adaptation to the setup 49". The CPU 63 controls one or more local unit(s) 69 which can consist of process or arrangement control units, monitoring units (for example temperature monitoring) etc. This control of the unit 69 takes place via implementing circuits 70. The CPU 55 controls functions (cf. relay functions or equivalent as above) with regard to the setup 10". The figure also shows in principle that the connection between units 72 and 73 can work by wireless functioning 74.

In accordance with the above, the microprocessor setup 49', 49''' etc. therefore has compatibility with signalling i1, i2 appearing on the connection according to applicable rules of systems engineering established by the units 3, 4, 5, 6 according to FIG. 1. Moreover, the microprocessor setup 49", 49''' works with a higher-level function in relation to the module unit according to the above. In this respect, each microprocessor can be arranged so as to work with a monitoring or protection function in relation to the module unit in question in order to ascertain whether the latter is complying with said rules or is affected by an error and, if appropriate, it disconnects the module unit from the connection. In this case, said functions are programmed into the microprocessor in question, for example the microprocessor 49, and the disconnection of the module unit is effected by means of circuits 71 controlled by the CPU 55. The microprocessor(s) 49, 49', 49", 49''' is (are) arranged so as to bring about or take part in testing or simulation functions during system construction. Such programs for said functions are also built into the microprocessor in question, which can then be run concurrently with functions in the higher-level units 2, 2'. In accordance with the above, one or more microprocessor(s) forming part of the connection facility can be arranged so as to work with passively higher-level functioning. Such functions can consist of monitoring, protection, simulation, diagnosis etc. and form part of the program for the microprocessor concerned. The microprocessors of the module unit handle the locally performed functions of the module via the unit 70. The microprocessor(s) of the connection facility 13' can be arranged so as to work actively with protocol or signal conversion functions with program controls which are likewise programmed in beforehand. According to the invention, said conversion functions take place essentially separately from said locally performed function (cf. 69) or functions in the module unit (cf. module unit 10"). The microprocessor setup 49", 49''' etc. can be arranged so as to perform the monitoring function(s) during normal operation of the system. This also takes place in a manner known per se with software known per se. Each microprocessor 49" is arranged so as to handle system requirements, and the microprocessor 10" is arranged so as in the main to handle the local function(s) of the module unit (cf. 69). This too can take place using known software. The module unit with its associated microprocessor 10" forms, in relation to the connection system 1' and the higher-level units 2, 2', a separate module unit, for example 10, which is arranged so as to be connectable to various types of connection system 1' (cf. above). The connection between the processor setups 49" and 10" can include a permanent point-to-point connection between the connection system 1, 1', 1a', 1a' and 1b, 1b', 1b" and the module unit, for example 10. Said memory means are arranged so as to receive from or send to another module unit, or a higher-level unit 2, 2', in the system a downloadable function or an application function with a protocol which differs from a current protocol by means of which the system is arranged to work in control, monitoring, communication functioning etc. The system can work on the one hand with a low-speed protocol and on the other hand with a protocol with a higher speed which is arranged so as to obtain access to the connection(s) via time-slot and/or filter arrangements (cf. the units 27, 29 and 28, 30). The filter arrangement is arranged so as to work by impedance adaptation at the connection facility concerned in order to reduce the loss in the facility or the point (cf. unit 58). The module units are arranged so as to belong to different system protocols, and the modules are arranged for adaptation to the current system connection in cases where this differs from the system affiliation of the module unit (cf. unit 68 in FIG. 4). According to the above, the system connection can consist of a CAN connection, and the point-to-point connection can have the construction indicated above in the form of a standard connection. According to the above, said connections can be wire-based, optical and/or radio connections. In spite of the fact that the module unit is of standard type, for example 251 type, the microprocessor(s) of the connection facility can implement characteristics which in conventional cases require more advanced circuits (cf. above). The module unit can work with a simplified local clock function or receive timing trigger signals from the connection facility according to a local protocol or direct trigger lines (cf. timing circuits above). The microprocessor(s) in the connection facility is (are) arranged so as to allow connection of a module unit which works with a characteristic required at system level, and any changes do not have to result in the system having to be redesigned in its entirety. Each connection facility is arranged so as to disconnect the module unit locally if errors occur in the latter, which disconnection can take place without any requirement for major switching over at bus segment level. In accordance with the above, one or more module unit(s) can be arranged with microprocessor setups which handle the various types of information which appear in the system separately or individually. The information types of the system can consist of a first information type which relates to the locally performed function of the module unit concerned (control, monitoring, diagnosis, simulation etc.), and a second information type relating to system administration, based on rules which apply in the system, performed on the connection(s). One or more first microprocessor(s) deals or deal with or is or are in this respect arranged so as to handle the first information, and one or more second microprocessor(s) is or are arranged so as to handle the second information type. The first microprocessor can then be integrated with the construction of the module unit concerned, and the second microprocessor is connected or connectable to the connection concerned for the purpose of being divided for only the module unit and the module unit constructor or the system and the system constructor (cf. above). The microprocessor(s) with associated or interacting memory means receive or send, in time slots and/or via filter arrangements, signals i3, i4 of one or more protocol(s) differing from the signals in the basic protocol of the system. The protocols work with a bit speed or bit speeds which considerably exceed(s) the bit speed of the basic protocol.

In accordance with the above, the second contact unit 20 as well can be considered to be arranged so as, as such, to perform one, two or all the various alternatives. Depending on system information via the bus connection 1 and/or information individually assigned to it in the microprocessor(s), to be precise in the software of the latter, it can cooperate in or determine the connection and disconnection of the module unit to and from the bus connection. The second contact unit can also, depending on said system information via the bus connection and/or the information assigned individually to it, establish internal or direct cooperation with the module unit, for said functions according to the above. The contact unit can also sense the signal status of the bus connection and passability on the bus connection, as seen from the module unit. This may mean that the module unit can be open to the connection in both directions thereof, or in only one direction (cf. above). As far as the other functioning of the contact unit is concerned, reference is made to the above; with regard to carrying out connection and disconnection, bypassing the module unit on the connection, buffering etc., reference is made to the above. The second contact unit can be arranged so as, for example, to control the functionality in terms of hardware, for example to physically break off the communication connection of the module unit in the sending state of the module unit when sending is not permitted according to the rules of the system, but still to register whether the module unit attempts to send in spite of the restriction. The second contact unit can furthermore be arranged so as, by means of the microprocessor, to establish an exclusive connection between the module unit and the bus connection in order to exchange information before the module unit receives permission to go out onto the bus connection either via the bus connection or a special connection or another connection. The contact unit can be arranged so as to exchange information with one or more system-monitoring/controlling unit(s) 2, 2' via the bus connection 1, 1'.

As far as the method according to the present invention is concerned, reference is made to the above with regard to production of a basic system concept and the use of basic concept information in order to determine the construction of the connection facility which is to be present in every module unit, and also the creation of the test program in question for monitoring the behaviour of the module unit. Two or more module units can be provided with a connection facility, and the construction concept and functioning concept of the connection facility are supplied in connection with the development or production of the module unit in question. When the construction concept or functioning concept is supplied, software or a program is supplied, according to the above, in which the construction and functioning concepts are simulated by means of other module units and connection facilities. In this way, the module unit can undergo advanced testing before connection and testing in the final system produced.

In accordance with the idea of the invention, the facility according to FIG. 4 can also be used for or in combination with Blue-Tooth information over wire-based connections which constitute parts of the overall communication or control connection. Use is then made of modulation and demodulation equipment in conjunction with the wire connections. Said equipment can consist of kinds known per se and can comprise filter arrangements for separation of the Blue-Tooth signals (information) and the signalling in the conventional distributed functioning.

Figure 5:
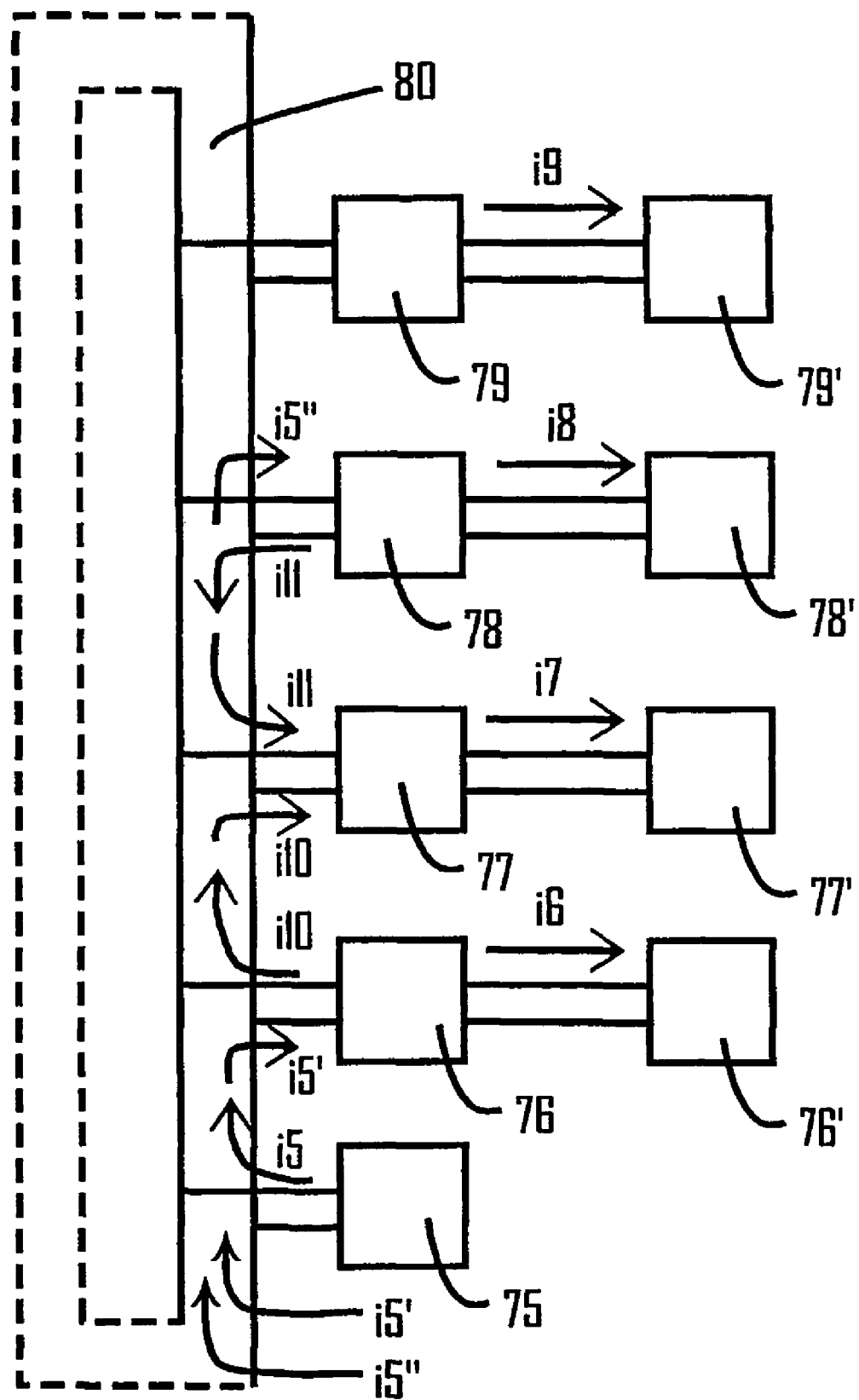
FIG. 5 shows in the form of a block diagram and in principle signal exchanges established between units in the system.

In FIG. 5, reference number 75 represents a system node which, in the illustrative embodiment, is of the "King" type in a CanKingdom system. The system also includes a setup with module-monitoring system nodes which have been designated by reference numbers 76, 77, 78 and 79. The system nodes are each connected to modules or module units 76', 77', 78' and 79' respectively. A bus system has been symbolized by reference number 80, and the system 80 can consist of a ring-connected system, for example according to the RedCan type. The unit 75 can send signals i5 on the bus connection 80, which signals are, in a manner known per se and in accordance with the above, received by the units 76, 77, 78 and 79. Said units can then, in a manner known per se and in accordance with the above, establish an information exchange with the units 76', 77', 78' and 79' respectively. The signal exchange between the units is symbolized in the figure by i6, i7, i8 and i9 respectively. In accordance with the idea of the invention, the unit 75 can on a suitable occasion download other information to the units 76, 77, 78 and 79. This information can therefore comprise information signals i5', i5" etc. In this context, the information i5' can be intended for the unit 76 and concern information about the unit 77, which information will therefore be present in the unit 76. The information i5" can concern information about the units 76 and 77 and is intended for the unit 78 which will therefore comprise said information about the units 76 and 77. Further information can go from the unit 75 to said units 76, 77, 78 and 79 which can therefore obtain information about one another. This information knowledge can be used when starting up the system as a whole. Each system node 76, 77, 78 and 79 checks and, if appropriate, modifies its closest neighbour(s) before connecting the latter up permanently to the bus connection. If a system node finds that a neighbour is not behaving correctly, it disconnects the neighbour in question from the bus connection. Information about the reason why correctness was not present can be sent out immediately on the bus connection or depending on inquiries by the unit 75 etc. Intermediate variants according to the above can also be arranged. If the bus connection is ring-connected according to RedCan, every system module can be checked by two adjacent neighbour modules. If both neighbours find that an intermediate module is defective, it is disconnected from the bus connection. If one neighbour finds that the intermediate module in question is defective, the neighbour can communicate in the other direction. In FIG. 5, reference numbers i10 and i11 indicate control signals from the units 76 and 78 respectively to the unit 77 which is therefore checked by the units 76 and 78 etc. The signal interaction described can be implemented technically in a manner known per se.

The invention is not limited to the embodiment shown above by way of example but can undergo modifications within the scope of the patent claims below and the inventive idea.

In accordance with the above example, a unit or microprocessor 49 (see, for example, FIG. 2) is included, which comprises or interacts with a change-over switch 53/54. In this case, a memory 50 common to the microprocessor 49 and the unit 10 is not required. If the change-over switch 53/54 is open, information can be transmitted to and from the memory 50 via the microprocessor 49 and communication on 34/35. The invention can demonstrate advantages with regard to having a communication bus for the system, having a communication bus which is basically serial, that is to say a data element is transmitted in each time unit, and the length of this time unit can be defined, for example in a varied manner, and having modules which it is desirable to connect to the bus connection.

The following problems can thus be solved. The module can be adapted so that it suits the system. This adaptation can take pace in various ways, for example by the module being adapted to the system requirements, that is to say it follows a certain profile, for example DeviceNet, CANopen etc., and the module comprising certain basic functions, for example CAN bus according to ISO 11898, and following, for example, CAN-Kingdom which comprises a configuration profile for creating an operating profile which suits the system.

The invention can accommodate further progress within technology over and above what is possible with CAN-Kingdom today. It makes it possible to separate the module further by introducing an intermediate unit. The least this unit must comprise is a memory as described in FIG. 3. By reading the memory 50', the unit 10' can procure the information it requires in order to adapt itself to the system.

The unit 20 according to the above, which comprises the microprocessor 49, belongs to the system, which means that the unit 20 knows from the outset how the communication on 1 appears or that it can in a known manner obtain this information via 1a. The unit 20 can comprise functions so that it can connect to the unit 10.

In further steps, the requirements for the unit 20 in order for it to be capable of connecting to the unit 10 are ensured. The unit 20 has a connection to the unit 10 which is suitable. The connection is suitable mechanically and electrically, optically etc. and constitutes or comprises one or more connection(s). The unit 20 can comprise a number of different types of such connections and tries until it finds the one which suits in the current functioning instance. When electrical/optical matching is present, a suitable transmission bit speed is initiated. After this, the unit must select the transmission profile the unit 10 requires. In one embodiment, this is more or less firmly defined before the unit 20 is connected to the module 10, for example CAN according to ISO 11898 with a suitable contact. In this way, the problems involved can be reduced to selecting bit speed and data profile(s). In such a case, the unit 20 can be prepared for a number of possible profiles defined beforehand, for example DeviceNet, CANopen, CAN-Kingdom, Volcano, OSEK, J1939, SDS etc.

The microprocessor 49 can subsequently communicate with both the system and the module 10. The next step is for the microprocessor 49 to ensure that the unit 20 can be connected up to the system in such a manner that it performs its task in a suitable manner, which can take place at different levels (cf. also above).

In a further embodiment, it is ensured that the module fits, for example that the module follows CAN-Kingdom, which is necessary in order for it to function in the system. After this, the module can be connected directly to the system by closing the switches 53 and 54. In this respect, it may be appropriate to adjust the bit speed before the unit can be connected to the system. In cases where the system unit can manage a number of different types of profile in the system, it may be sufficient for the microprocessor 49 to transmit information about the module 10 to the system unit 2 which can subsequently take over control of the module 10 after it is connected up by 53 and 54. If the module 10 is particularly flexible, for example follows CAN-Kingdom, it may be possible to configure the module 10 in such a manner that it functions in the system based on J1939. In the event that the profile in the module does not coincide or cannot be adapted to the system in a suitable manner, the microprocessor 49 is used as a translator between the information on the means 34/35 and 42/43. The microprocessor 49 can do this by receiving data packets, for example through NMEA-2000, on the means 34/35, repackaging them in the microprocessor 49 and sending them out again on the system which follows, for example, DeviceNet. In the same way, the microprocessor 49 can translate information on the system bus connection so that it suits the module 10. In one embodiment, the signals from the module 10 relate to a basic function from, for example, a CAN controller. There can then be electronics in the unit 20 which adapt the signals, for example "LowSpeed", "High-Speed", "SingleWire", optical etc., to what is applicable on the system bus connection. In this case, it may be necessary for one or more of the measures described under preceding points to be carried out as well before the module functions in the system. The next step can include entirely different communication methods in the system compared with the communication to and from the module. It may then be appropriate to arrange the module 10 so as to communicate with the unit 20 by USB. In the unit 20, the microprocessor or unit 49 has two or more different connection possibilities so that, for example, it communicates with the module using USB and it communicates out onto the system using CAN, Ethernet or another system. In this case, the module is arranged as a translator between the module 10 and the system bus connection. The great advantage of arranging the module or the microprocessor setup 49 as a bridge is that it is possible to have different conceptions of time in the module 10 compared with the system. It may be noted that when the unit or the setup 49 is made to function as a bridge, appreciably or significantly great system advantages are obtained owing to inter alia the fact that the task of the module is made independent of the communication in the system.

The invention claimed is:

1. A communication system, comprising:
  a plurality of module units, wherein individual of the plurality of module units further comprises at least one processing device;
  at least one system level unit connected to the plurality of module units via a system connection and connected to at least one device that is configured to provide system rules for controlling functioning of the system; and
  a plurality of connection facilities, comprising a first contact unit and a second contact unit, wherein individual of the second contact units comprises at least one processing device;
  wherein at least one of the plurality of module units comprising at least one processing device are connected to the system connection via at least one of the plurality of connection facilities comprising at least one processing device,
  wherein the at least one of the plurality of connection facilities are configured to be compatible with signals associated with the system connection according to the system rules and compatible with a system function associated with the at least one of the plurality of module units;
  wherein the at least one of the plurality of connection facilities is configured to monitor the at least one of the plurality of module units including analyzing data from the at least one of the plurality of module units to determine a state of operation of the at least one of the plurality of module units.

2. The system of claim 1, wherein the at least one processing device associated with the second contact units is configured to determine if an error associated with at least one of the plurality of module units exists and if an error exists, to disconnect the at least one of the plurality of module units from the system connection.

3. The system of claim 1, wherein the at least one of the plurality of module units comprises a dedicated processor configured to execute local functions of each of the plurality of module units,
  wherein the at least one processing device associated with the second contact unit of the plurality of connection facilities is configured to perform a conversion function distinct from the local functions of the dedicated processor.

4. The system of claim 1, wherein the at least one processing device associated with the second contact unit is configured to execute a monitoring function during operation of the system.

5. The system of claim 1, wherein the at least one of the plurality of module units comprises:
  a first processor configured to execute local functions associated with the at least one of the plurality of module units; and
  a second processor configured to execute system requirements.

6. The system of claim 1, wherein a module unit is configured to connect to different types of system connections.

7. The system of claim 1, wherein at least one of the plurality of connection facilities comprises a memory configured to communicate within the system and an application function having a protocol which differs from a current protocol through which the system is configured to function.

8. The system of claim 1, wherein various ones of the plurality of module units are assigned to different system protocols,
  wherein at least one of the plurality of module units are configured to adapt to a current system connection which is different from the different system protocols.

9. The system of claim 1, wherein the system connection is one of a wire-based, an optical, or a radio connection.

10. The system of claim 1, wherein the plurality of connection facilities comprises an optical connection between the system connection and an associated module unit.

11. The system of claim 1, wherein at least one of the plurality of module units comprises CAN transceiver and the at least one processing device associated with the second contact unit is configured to implement circuits for bus failure recovery.

12. A communication system, comprising:
  a plurality of module units configured to perform one or more functions, wherein individual of the plurality of module units further comprises at least one processing device;
  at least one system level unit connected to the plurality of module units via a system connection and connected to at least one device configured to provide system rules to control functioning of the system; and
  a plurality of connection facilities comprising a first contact unit and a second contact unit, wherein individual of the second contact units comprises at least one processing device;
  wherein at least one of the plurality of module units comprising at least one processing device are connected to the system connection via at least one of the plurality of connection facilities comprising at least one processing device, wherein the at least one of the plurality of connection facilities are configured to be compatible with signals associated with the system connection according to the system rules and compatible with a system function associated with at least one of the plurality of module units;

wherein the at least one processing device is configured to execute a simulation function during system construction.

13. A communication system, comprising:

a plurality of module units configured to perform one or more functions, wherein individual of the plurality of module units further comprises at least one microprocessor;

at least one system level unit connected to the plurality of module units via a system connection and connected to at least one device configured to provide system rules to control functioning of the system;

a plurality of connection facilities comprising a first contact unit and a second contact unit, wherein individual of the second contact units comprises at least one microprocessor;

a permanent point-to-point connection between the at least one of the plurality of connection facilities and an associated module unit;

wherein at least one of the plurality of module units comprising at least one microprocessor are connected to the system connection via at least one of the plurality of connection facilities comprising at least one microprocessor, wherein the at least one of the plurality of connection facilities are configured to be compatible with signals associated with the system connection according to the system rules and compatible with a system function associated with at least one of the plurality of module units; and wherein the system connection comprises a CAN connection, and the permanent point-to-point connection comprises a connection selected from at least one of USB or IEEE 1394.

14. A communication system, comprising:

a plurality of module units configured to perform one or more functions, wherein individual of the plurality of module units further comprises at least one processing device;

at least one system level unit connected to the plurality of module units via a system connection and connected to at least one device configured to provide system rules to control functioning of the system; and a plurality of connection facilities comprising a first contact unit and a second contact unit, wherein individual of the second contact units comprises at least one processing device;

wherein at least one of the plurality of module units comprising at least one processing device are connected to the system connection via at least one of the plurality of connection facilities comprising at least one processing device, wherein the at least one of the plurality of connection facilities are configured to be compatible with signals associated with the system connection according to the system rules and compatible with a system function associated with at least one of the plurality of module units;

wherein the system is configured to work with a CAN protocol and with a protocol having a higher bit rate, wherein access to the system connection is obtained via time slots.

15. A communication system, comprising:

a plurality of module units configured to perform one or more functions, wherein individual of the plurality of module units further comprises at least one processing device;

at least one system level unit connected to the plurality of module units via a system connection and connected to at least one device configured to provide system rules to control functioning of the system; and a plurality of connection facilities comprising a first contact unit and a second contact unit, wherein individual of the second contact units comprises at least one processing device;

wherein at least one of the plurality of module units comprising at least one processing device are connected to the system connection via at least one of the plurality of connection facilities comprising at least one processing device, wherein the at least one of the plurality of connection facilities are configured to be compatible with signals associated with the system connection according to the system rules and compatible with a system function associated with at least one of the plurality of module units;

wherein at least one processing device associated with the second contact unit is configured to execute time-keeping functions for an associated module unit, wherein the associated module unit receives timing trigger signals from the at least one of the plurality of connection facilities according to a local protocol or direct trigger lines.

16. A method comprising:

receiving information from at least one system node associated with a communication system wherein the at least one system node is configured to provide system rules for controlling an operation of the communication system;

sending information to at least one of a plurality of module units associated with the communication system;

monitoring the at least one of the plurality of module units including analyzing data from the at least one of the plurality of module units; and configuring the at least one of the plurality of module units to fit the system rules for the communication system depending at least in part on the data from the at least one of the plurality of module units.

17. An apparatus comprising:

a first contact unit configured to connect to at least one module unit;

a second contact unit having a processing device; and at least one controller unit configured to provide apparatus rules for controlling an operation of a communication apparatus;

wherein the processing device is configured to send information to the at least one controller unit and to at least one of the plurality of module units;

wherein the processing device is configured to receive information from the at least one controller unit and the at least one of the plurality of module units;

wherein the processing device is configured to monitor at least one of the plurality of module units including analyzing data from the at least one of the plurality of module units to determine a state of operation of the at least one of the plurality of module units.

18. An apparatus comprising:
- a first contact unit configured to connect to at least one module unit;
- at least one module unit configured to connect to the first contact unit;
- a second contact unit having at least one processing device configured to send information to at least one controller unit and the at least one module unit and configured to receive information from the at least one controller unit and the at least one module unit; and
- wherein the at least one processing device is configured to monitor the at least one module unit including analyzing data from the at least one module unit to determine a state of operation of the at least one module unit.

19. The apparatus of claim 18 wherein the processing device is further configured to execute a simulation function associated with the at least one module unit.

20. The apparatus of claim 18 wherein the at least one module unit further comprises a module processing device.

21. The apparatus of claim 20 wherein the module processing device is configured to execute at least one local function of the at least one module unit;
- wherein the processing device is configured to perform at least one conversion function distinct from the at least one local function.

22. The apparatus of claim 18 wherein the at least one processing device is configured to execute time-keeping functions using timing trigger signals transmitted to the at least one module unit according to a local protocol or direct trigger lines.

23. The apparatus of claim 18 wherein the at least one processing device is configured to send and receive information to the at least one controller unit despite being disconnected from the at least one module unit.

* * * * *